(12) United States Patent
Arur

(10) Patent No.: US 11,960,508 B2
(45) Date of Patent: Apr. 16, 2024

(54) DATA STITCHING ACROSS FEDERATED DATA LAKES

(71) Applicant: Cisco Technology, Inc., San Jose, CA (US)

(72) Inventor: Raghu Rajendra Arur, Tumkur (IN)

(73) Assignee: CISCO TECHNOLOGY, INC., San Jose, CA (US)

( * ) Notice: Subject to any disclaimer, the term of this patent is extended or adjusted under 35 U.S.C. 154(b) by 102 days.

(21) Appl. No.: 17/583,601

(22) Filed: Jan. 25, 2022

(65) Prior Publication Data

US 2023/0237070 A1 Jul. 27, 2023

(51) Int. Cl.
*G06F 16/28* (2019.01)
*G06F 16/242* (2019.01)
*G06F 16/2455* (2019.01)
*G06F 16/248* (2019.01)

(52) U.S. Cl.
CPC .......... *G06F 16/283* (2019.01); *G06F 16/244* (2019.01); *G06F 16/2456* (2019.01); *G06F 16/248* (2019.01)

(58) Field of Classification Search
None
See application file for complete search history.

(56) References Cited

U.S. PATENT DOCUMENTS

| | | | |
|---|---|---|---|
| 10,547,674 B2 | 1/2020 | Jerrim | |
| 10,574,575 B2 | 2/2020 | Rao et al. | |
| 10,798,015 B2 | 10/2020 | Rao et al. | |
| 10,812,341 B1 | 10/2020 | Campello De Souza et al. | |
| 10,819,556 B1 | 10/2020 | Rangasamy et al. | |
| 11,327,966 B1* | 5/2022 | O'Krafka | G06F 11/1471 |
| 2016/0359880 A1* | 12/2016 | Pang | H04L 67/01 |
| 2016/0380886 A1 | 12/2016 | Blair et al. | |
| 2019/0230011 A1* | 7/2019 | Gandham | H04L 41/145 |
| 2019/0230127 A1* | 7/2019 | Gandham | H04L 41/082 |
| 2020/0050494 A1 | 2/2020 | Bartfai-Walcott et al. | |
| 2022/0012363 A1* | 1/2022 | Colcord | G06F 16/2457 |

OTHER PUBLICATIONS

Li, et al., "Minimizing Communication Cost in Distributed Multi-query Processing", Proceedings of the 25th International Conference on Data Engineering, ICDE 2009, Mar. 29, 2009-Apr. 2, 2009, 14 pages, Shanghai, China.

* cited by examiner

*Primary Examiner* — Dawaune A Conyers
(74) *Attorney, Agent, or Firm* — Behmke Innovation Group LLC; James M. Behmke; James J. Wong

(57) ABSTRACT

In one embodiment, a device, in communication with a plurality of data lake sites, receives a federated data lake query. The device determines a plurality of data lake operator sets that each correspond to one of the plurality of data lake sites, wherein each of the plurality of data lake operator sets is used to establish a respective data pipeline for the federated data lake query. The device selects a particular data lake site of the plurality of data lake sites as a destination for data pipelines that are established for the federated data lake query. The device sends the plurality of data lake operator sets that each correspond to one of the plurality of data lake sites to cause the plurality of data lake sites to send query results to the particular data lake site using the data pipelines, wherein the particular data lake site stitches the query results.

20 Claims, 11 Drawing Sheets

| Flow Fields |
|---|
| FabricName 702 |
| Source IP, Source Port, Destination IP, Destination Port, Protocol 704 |
| Flow Path (Ingress Port and Egress Port of each switch the flow travels through) 706 |
| Port where the packet was dropped (if packet is dropped) 708 |
| Network Stats (# of packets, bytes) 710 |
| Drop Counters (# of drops by reason- policy-drop, forwarding drop etc.) 712 |
| Latency (Time taken by the flow to pass through the fabric) 714 |
| Start and End timestamps of the collection 716 |
| TCP flags 718 |
| ..... (many other fields) 720 |

FIG. 7

DATA STITCHING ACROSS FEDERATED DATA LAKES

TECHNICAL FIELD

The present disclosure relates generally to computer networks, and, more particularly, to data stitching across federated data lakes.

BACKGROUND

Network architectures have become increasingly complex. For example, network traffic in a data center could previously be analyzed in an "east to west" fashion due to its siloed, or "on premise", design. The conventional data center, now, has been replaced more and more by massively scalable data centers (MSDCs) that facilitate application traffic flows across a plurality of data centers over a wide area network (WAN), where the data centers can be physically apart from each other by large distances. Other network architectures that include enterprise computing environments, cloud computing environments, etc. have also become increasingly complex, for example, by having a web application span across multiple domains (i.e., "sites"). Guaranteeing end-to-end service legal agreements (SLAs) for applications served, processed, etc. by these network architectures as well as troubleshooting network issues pose many challenges. That is, SLAs for traffic for these applications have become stricter, necessitating more robust troubleshooting and granular visibility into the complex network architectures.

BRIEF DESCRIPTION OF THE DRAWINGS

The embodiments herein may be better understood by referring to the following description in conjunction with the accompanying drawings in which like reference numerals indicate identically or functionally similar elements, of which:

FIG. 7 illustrates an example data structure for information that may be sent over data pipelines by federated data lake sites.

DESCRIPTION OF EXAMPLE EMBODIMENTS

Overview

According to one or more embodiments of the disclosure, a device, in communication with a plurality of data lake sites, receives a federated data lake query. The device then determines, based on the federated data lake query, a plurality of data lake operator sets that each correspond to one of the plurality of data lake sites. Each of the plurality of data lake operator sets may be used to establish a respective data pipeline for the federated data lake query. The device further selects a particular data lake site of the plurality of data lake sites as a destination for one or more data pipelines that are established for the federated data lake query. Afterwards, the device sends the plurality of data lake operator sets that each correspond to one of the plurality of data lake sites to cause the plurality of data lake sites to send query results to the particular data lake site using the one or more data pipelines. The particular data lake site is configured to stitch the query results for the federated data lake query.

Other embodiments are described below, and this overview is not meant to limit the scope of the present disclosure.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, and others. The Internet is an example of a WAN that connects disparate networks throughout the world, providing global communication between nodes on various networks. Other types of networks, such as field area networks (FANs), neighborhood area networks (NANs), personal area networks (PANs), enterprise networks, etc. may also make up the components of any given computer network. In addition, a Mobile Ad-Hoc Network (MANET) is a kind of wireless ad-hoc network, which is generally considered a self-configuring network of mobile routers (and associated hosts) connected by wireless links, the union of which forms an arbitrary topology.

Figure 1:
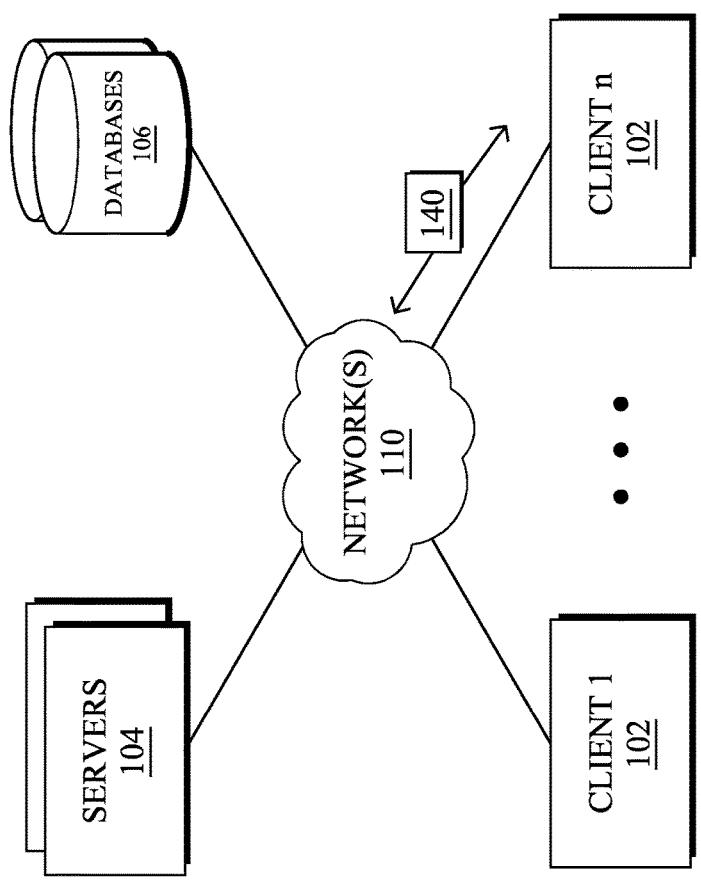
FIG. 1 illustrates an example computer network.

FIG. 1 is a schematic block diagram of an example simplified computing system 100 illustratively comprising any number of client devices 102 (e.g., a first through nth client device), one or more servers 104, and one or more databases 106, where the devices may be in communication with one another via any number of networks 110. The one or more networks 110 may include, as would be appreciated, any number of specialized networking devices such as routers, switches, access points, etc., interconnected via wired and/or wireless connections. For example, devices 102-104 and/or the intermediary devices in network(s) 110 may communicate wirelessly via links based on WiFi, cellular, infrared, radio, near-field communication, satellite, or the like. Other such connections may use hardwired links, for example, Ethernet, fiber optic, etc. The nodes/devices typically communicate over the network by exchanging discrete frames or packets of data (packets 140) according to predefined protocols, such as the Transmission Control Protocol/Internet Protocol (TCP/IP) other suitable data structures, protocols, and/or signals. In this context, a protocol consists of a set of rules defining how the nodes interact with each other.

Client devices 102 may include any number of user devices or end point devices configured to interface with the techniques herein. For example, client devices 102 may include, but are not limited to, desktop computers, laptop computers, tablet devices, smart phones, wearable devices (e.g., heads up devices, smart watches, etc.), set-top devices, smart televisions, Internet of Things (IoT) devices, autonomous devices, or any other form of computing device capable of participating with other devices via network(s) 110.

Notably, in some embodiments, servers 104 and/or databases 106, including any number of other suitable devices (e.g., firewalls, gateways, and so on) may be part of a cloud-based service. In such cases, the servers and/or databases 106 may represent the cloud-based device(s) that provide certain services described herein, and may be distributed, localized (e.g., on the premise of an enterprise, or "on prem"), or any combination of suitable configurations, as will be understood in the art.

Those skilled in the art will also understand that any number of nodes, devices, links, etc. may be used in computing system 100, and that the view shown herein is for simplicity. Also, those skilled in the art will further understand that while the network is shown in a certain orientation, the system 100 is merely an example illustration that is not meant to limit the disclosure.

Notably, web services can be used to provide communications between electronic and/or computing devices over a network, such as the Internet. A web site is an example of a type of web service. A web site is typically a set of related web pages that can be served from a web domain. A web site can be hosted on a web server. A publicly accessible web site can generally be accessed via a network, such as the Internet. The publicly accessible collection of web sites is generally referred to as the World Wide Web (WWW).

Also, cloud computing generally refers to the use of computing resources (e.g., hardware and software) that are delivered as a service over a network (e.g., typically, the Internet). Cloud computing includes using remote services to provide a user's data, software, and computation.

Moreover, distributed applications can generally be delivered using cloud computing techniques and/or enterprise computing techniques. For example, distributed applications can be provided using a cloud computing model, in which users are provided access to application software and databases over a network. The cloud providers generally manage the infrastructure and platforms (e.g., servers/appliances) on which the applications are executed. Various types of distributed applications can be provided as a cloud service or as a Software as a Service (SaaS) over a network, such as the Internet.

Figure 2:
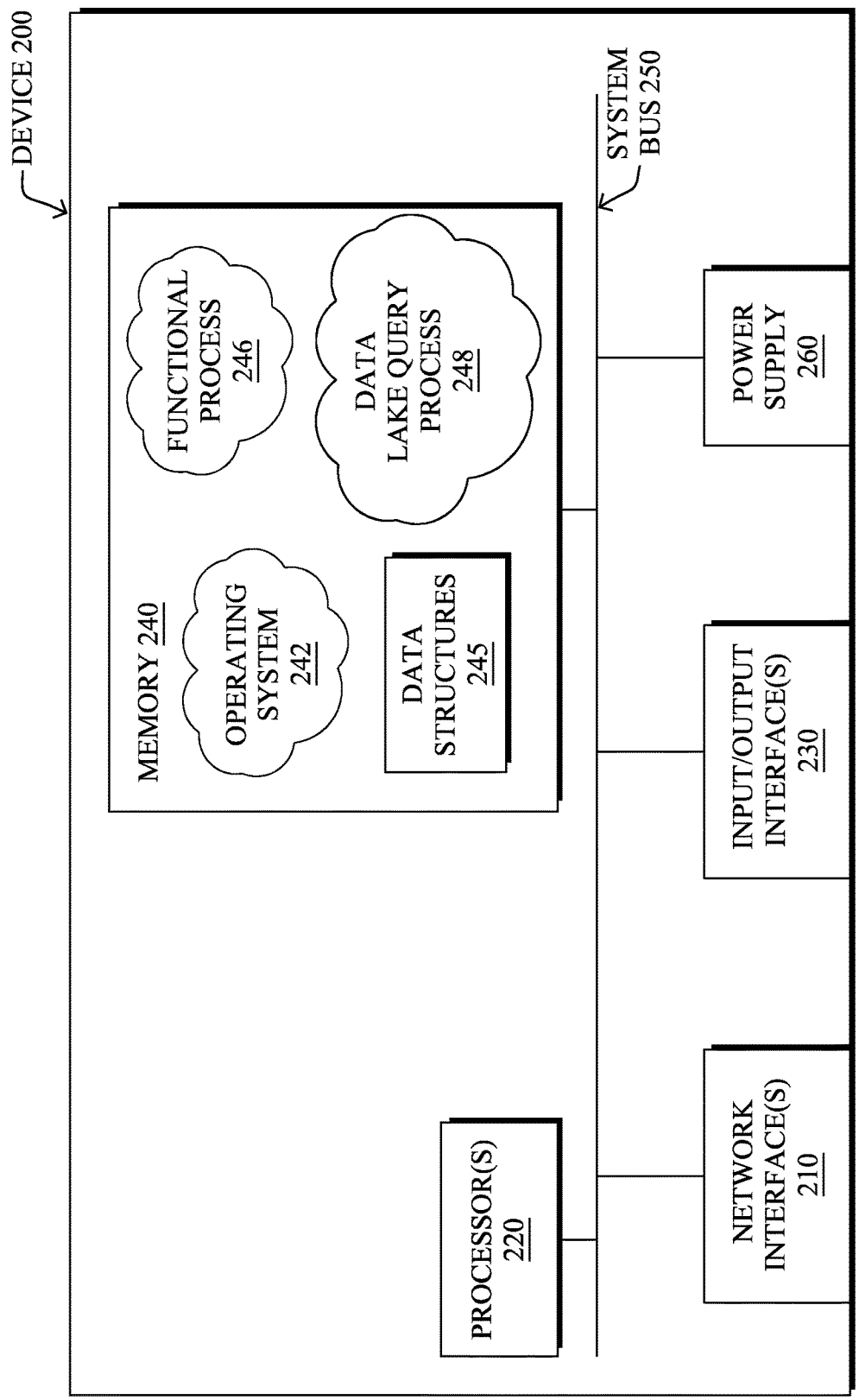
FIG. 2 illustrates an example computing device/node.

FIG. 2 is a schematic block diagram of an example node/device 200 that may be used with one or more embodiments described herein, e.g., as any of the devices 102-106 shown in FIG. 1 above. Device 200 may comprise one or more network interfaces 210 (e.g., wired, wireless, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links coupled to the network(s) 110. The network interfaces may be configured to transmit and/or receive data using a variety of different communication protocols. Note, further, that device 200 may have multiple types of network connections via interfaces 210, e.g., wireless and wired/physical connections, and that the view herein is merely for illustration.

Depending on the type of device, other interfaces, such as input/output (I/O) interfaces 230, user interfaces (UIs), and so on, may also be present on the device. Input devices, in particular, may include an alpha-numeric keypad (e.g., a keyboard) for inputting alpha-numeric and other information, a pointing device (e.g., a mouse, a trackball, stylus, or cursor direction keys), a touchscreen, a microphone, a camera, and so on. Additionally, output devices may include speakers, printers, particular network interfaces, monitors, etc.

The memory 240 comprises a plurality of storage locations that are addressable by the processor 220 and the network interfaces 210 for storing software programs and data structures associated with the embodiments described herein. The processor 220 may comprise hardware elements or hardware logic adapted to execute the software programs and manipulate the data structures 245. An operating system 242, portions of which are typically resident in memory 240 and executed by the processor, functionally organizes the device by, among other things, invoking operations in support of software processes and/or services executing on the device. These software processes and/or services may comprise a one or more functional processes 246, and on certain devices, an illustrative data lake query process 248, as described herein. Notably, functional processes 246, when executed by processor(s) 220, cause each particular device 200 to perform the various functions corresponding to the particular device's purpose and general configuration. For example, a router would be configured to operate as a router, a server would be configured to operate as a server, an access point (or gateway) would be configured to operate as an access point (or gateway), a client device would be configured to operate as a client device, and so on.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Data Stitching Across Federated Data Lakes

As noted above, the directionality of flows for network traffic in relation to data centers have become increasingly complex. That is, application traffic can no longer be understood as merely as moving "east to west" within a data center. For example, massively scalable data centers (MSDCs) have now supplanted the "east to west" model by facilitating application traffic across a plurality of data centers over a wide area network (WAN). Hybrid cloud computing has also become popular, where application traffic may travel between an "on premise" data center and a cloud computing environment. In other examples, communication over WAN between data centers with campus environments, enterprise environments, and even remote access locales (e.g., work from home) has also increased in prevalence. Network architectures can now be understood as including a plurality of domains, where each of the domains may individually generate its own data lake of information. The domains may comprise a data center, an enterprise environment, cloud computing environment, etc.

As network architectures that involve, for example, data centers have become more complex, guaranteeing end-to-end service legal agreements (SLAs) for applications as well as troubleshooting latency issues with the applications has become increasingly difficulty. In other words, applications that may be served, processed, etc. across the previously mentioned domains are oftentimes sensitive to latency, drops, etc. that immediately impact end user/customer experience. As such, SLAs for traffic for these applications have become stricter, necessitating more robust troubleshooting and granular visibility into the complex network architectures. Conventional solutions, however, primarily focus on streaming information (e.g., telemetry measurements, application performance, sensor data, etc.) from individual domains of a network architecture to a central data lake (i.e., data store) then, at the cumulative data lake (that combines information from multiple domains), analyzing the information. This solution poses many issues, including heavy resource, computational, monetary, etc. costs with both aggregating information (over WAN) for and maintaining the central data lake.

The techniques herein, therefore, introduce data stitching across federated data lakes. Notably, domains/data centers of a network architecture may be viewed as individual data lakes of information (e.g., telemetry, application performance, etc.) regarding one or more applications of the network architecture. Instead of generating a centralized data lake that receives, stores, processes, etc. the information, the individual data lakes may be treated as a group of federated data lakes. A query may be used to gather information for troubleshooting or visibility for the group of federated data lakes, where the query is disintegrated into individual operators for each data lake (of the federated data lakes) that are used to set up data pipelines for collecting the information from each data lake. That is, collection of information for a particular data lake is local to a data center or domain. Determining how the query is broken down may be done using query planning techniques that reduce data exchange as well as emphasize source-side reduction, where such query planning may be bound be a requirement that only cross-data center or cross-domain flows are exchanged over a WAN.

One of the federated data lakes, e.g., based on minimizing resource costs, computational costs, monetary costs, etc., is selected as a destination for information from other data pipelines for the federated query. At this selected data lake, streams of information (i.e., flows) from each of the individual data lakes may be stitched across-data centers and/or across-domains. The stitched flows may then be used to gain actionable information and/or insights for the federated data lakes (that comprise the networking architecture), including, end-to-end flow path info across data lakes, latency of flows (across and within data lakes), hop-by-hop latency, etc.).

Illustratively, the techniques described herein may be performed by hardware, software, and/or firmware, such as in accordance with the data lake query process 248, which may include computer executable instructions executed by the processor 220 (or independent processor of interfaces 210) to perform functions relating to the techniques described herein.

Specifically, according to one or more embodiments described herein, a device, in communication with a plurality of data lake sites, receives a federated data lake query. The device determines, based on the federated data lake query, a plurality of data lake operator sets that each correspond to one of the plurality of data lake sites, wherein each of the plurality of data lake operator sets is used to establish a respective data pipeline for the federated data lake query. The device selects a particular data lake site of the plurality of data lake sites as a destination for one or more data pipelines that are established for the federated data lake query. The device sends the plurality of data lake operator sets that each correspond to one of the plurality of data lake sites to cause the plurality of data lake sites to send query results to the particular data lake site using the one or more data pipelines, wherein the particular data lake site is configured to stitch the query results for the federated data lake query.

Figure 3:
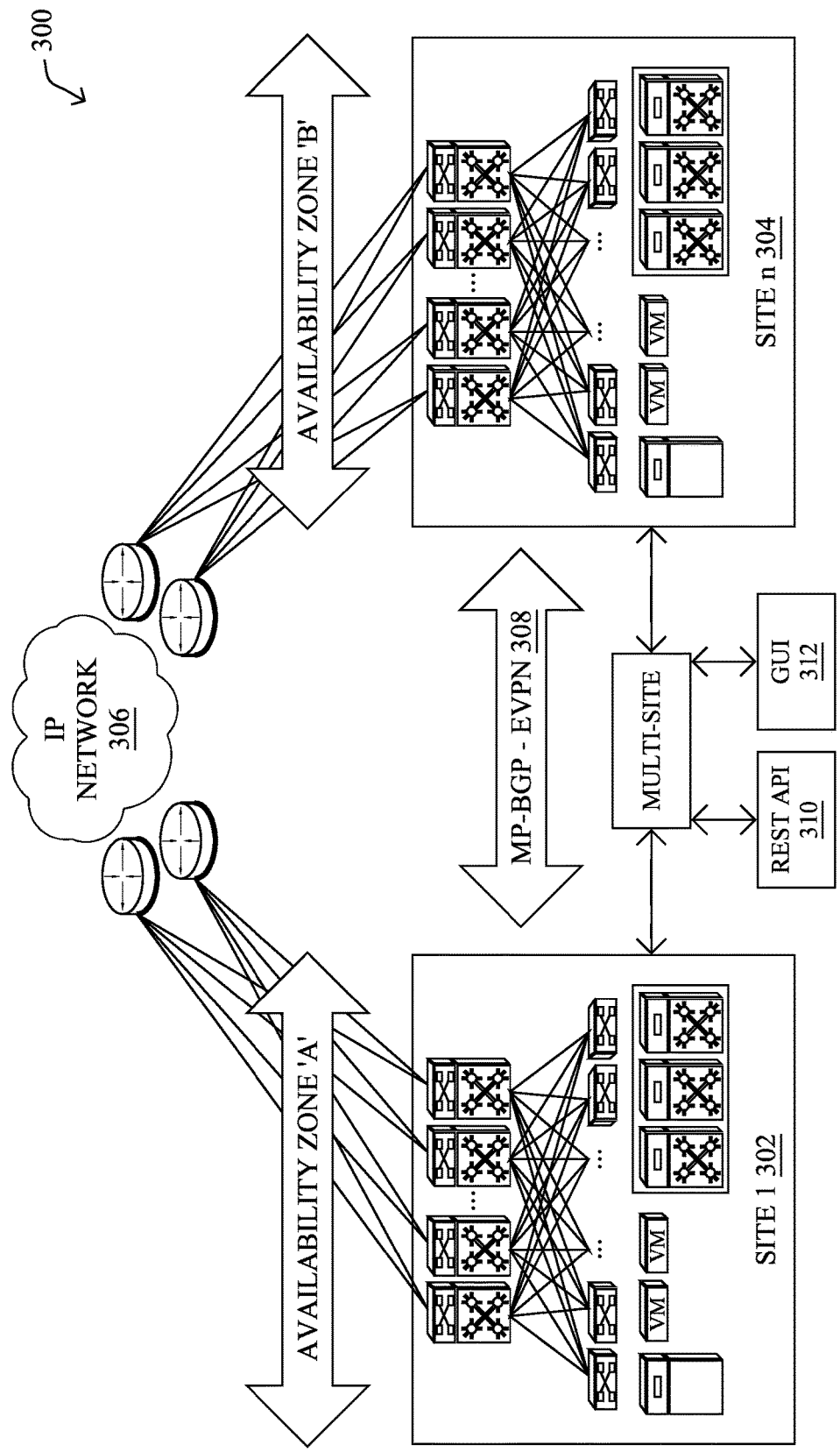
FIG. 3 illustrates an example network architecture for data stitching across federated data lakes.

Operationally, FIG. 3 illustrates an example network architecture 300 for data stitching across federated data lakes, according to various embodiments herein. As shown, network architecture 300 may comprise first site 302 and nth site 304, where these sites may be understood as domains of network architecture 300 that can be geographically and functionally distributed. First site 302 and nth site 304 may, as shown, comprise one or more of a data center, cloud computing environment, enterprise computing environment, etc. that may communicate within each of the sites. It is to be understood that each of first site 302 and site 304 may comprise a data center, a WAN, a campus network, and/or a virtualized/containerized infrastructure (that us virtualized or real switches). Particularly, the sites may be populated with application centric infrastructure (ACI), Cisco NX-OS compatible infrastructure, a software-defined WAN, a network service provider, a container networking interface (CNI) (e.g., Calico, Flannel, etc.), etc.

First site 302 and nth site 304 may communicate with one another over an IP network 306 or over one more multi-site communication methods 308 (e.g., EVPN, MP-BGP, etc.). Further, it is contemplated that one more multi-site communication methods 308 may be accessed using a RESTful application programming interface 310 and that a graphical user interface 312 may be interfaced with, for example, to assess performance of network architecture 300. Network architecture 300 may host, process, etc. one or more applications that among first site 302 and nth site 304.

As described in greater detail herein, devices of first site 302 and nth site 304 may be configured to generate and communicate various types of information, or a "data lake" of information, that may be aggregated, stitched, etc. then analyzed to obtain actionable insights. For example, a networking device (e.g., switch, router, etc.) of first site 302 may be configured to observe, generate, and output flow telemetry information that may be packaged as a five-tuple of information that gets exported from every switch through which the data packet passes through (e.g., the flow telemetry information may be exported in NetFlow or Internet Protocol Flow Information Export (IPFIX) formats). Along with the 5-tuple information, the networking device may be configured to include timestamp, transmit/receive statistics information, etc. In a more specific example, the networking device may comprise a cloud scale application-specific integrated circuit (ASIC) programmed to capture drop reasons, TCP flags, etc., that, when analyzed, provides visibility into network performance and network errors. It is contemplated that in lieu or in addition to the flow telemetry information described above, other types of information may be observed, generated, and output, including, for example, sensor information (e.g., is captured by sensor device) or application performance information (e.g., captured by agents configured to monitor performance one or more applications of first site 302 and nth site 304).

As previously mentioned, information from first site 302 and nth site 304 may, for the purposes of visibility into and troubleshooting network architecture 300, be gathered and stored a site separate entirely from network architecture 300 (e.g., in a separate data lake). However, such approach requires intensive processing, storage practices, etc. that becomes resource wasteful, monetarily expensive, and even impractical. The techniques herein, instead, propose a method of treating first site 302 and nth site 304 as one data lake, then "slicing" a query for information from all of network architecture 300 into small operators that are shipped to individual data lake sites. Reduced and/or filtered information from each of the tests may then aggregated/stitched and analyses may be performed. In other words, the techniques herein, as will be described greater detail herein below, provide for federated flow stitching, query planning, cost-based decision analysis, and expressiveness of a query for data stitching across federated data lakes.

FIGS. 4A-4D illustrate an example architecture for data stitching across federated data lakes. As shown, a network architecture 400 may include a first data lake 402 that corresponds to a first domain 404, a second data lake 406 that corresponds to a second domain 408, and a third data lake 410 that corresponds to a third domain 412, where each of the domains, as described, above may comprise one or more of a data center, cloud computing environment, etc.

From the perspective of first data lake 402 and first domain 404, first data lake 402 may be considered a "local data lake" or one that is located near or part of the fabric (e.g., first domain 404) that may be monitored (e.g., by taking part of a federated data lake according to the techniques described herein). A given fabric is assigned a data lake where all information regarding a particular domain, including telemetry information (e.g., flow-telemetry, operational telemetry, etc.), application performance information, sensor information from IoT devices, etc. may streamed. In the example of the information including telemetry information, such information may include operational data like protocol states, end-point database, route-database, interface information, etc. Further from the perspective of first data lake 402 and first domain 404 a "remote data lake" may be understood as information regarding a data lake is stored, for example, second data lake 406 and third data lake 410. Additionally, each of the data lakes may comprise a metadata store, where the metadata store comprises a store of operational data/information that does not change frequently in a given fabric (or domain) and, as will be described in greater detail herein below, may be used for query planning determinations. As is understood in the art, the metadata stored may be globally synchronized among metadata stores of the data lakes (e.g., using one or more synchronization and consistency protocols).

Generally, a federation of data lakes (e.g., first data lake 402, second data lake 406, and third data lake 410) may be understood as a single database spanning geographies, where the database, at a given data lake, may be configured to receive a query (e.g., a federate data lake query). In the example shown in FIG. 4A, a device of first domain 404 may receive the query 414 from an end user 416, where the query comprises a flow correlation query across multiple fabric/federated data lakes. Such flow correlation query may be understood functionally as similar to executing a join query with filters where flows from each fabric (e.g., data lake) is treated as a table of data lake. To this end, each of the data lakes may be configured to establish one or more data pipelines based on the query. It is contemplated that end user 416 may perform a plurality of types of queries, including a:

1. correlation using a sitenames and subnets (e.g., [<site1>:<subnetX>, <site2>:<subnetY>, . . . ]), where end user 416 specifies sitename and subnet filter that end user 416 is interested to correlate (e.g., [sjc-fabric:(156.89.0.0/16, 34.21.9.0/24), blr-fabric:(123.34.0.0/16, 54.23.0.0/16)]);
2. correlation using only subnets (e.g., [<subnetX>, <subnetY>, <subnetX> . . . ]), where end user 416 specifies only subnets (It is contemplated that operational data stored in a metadata store may be leveraged to identify where specified subnets are used, to derive sitenames, to and set-up data-pipelines one or more data pipelines; or
3. correlation using application mappings, tags, or domain name system entries (e.g., [(mysql-servers, apache-servers), (web-tier, sjc-campus-users), (production-servers, backup-servers), (web.app1.company.com, db.app1.company.com)]), where this information is used to derive sitename and the subnets (It is contemplated that the application mappings, tags, or domain name system entries may be stored in a metadata store.)

Figure 4A:
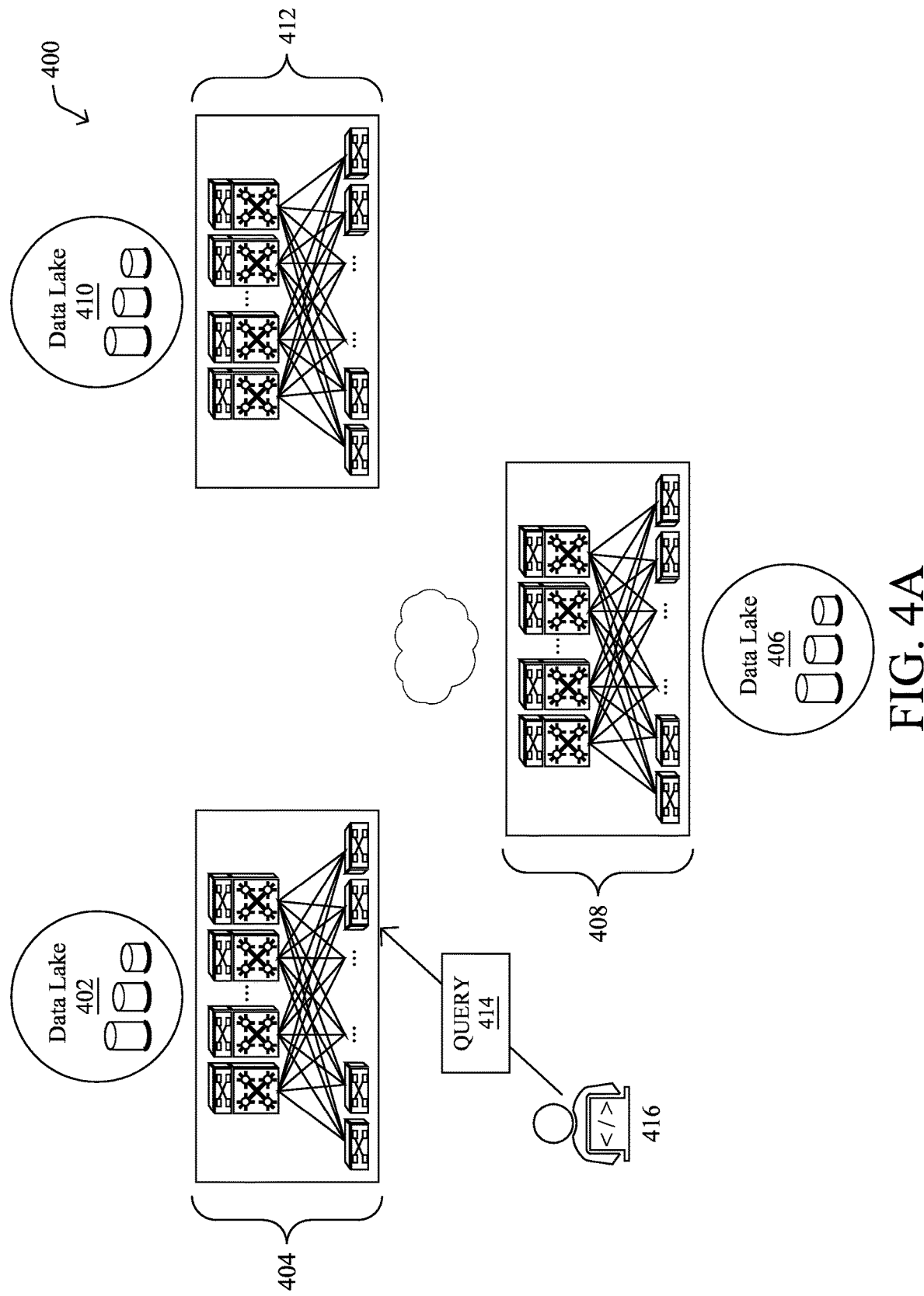
FIGS. 4A-4D illustrate an example architecture for data stitching across federated data lakes.
Figure 4B:
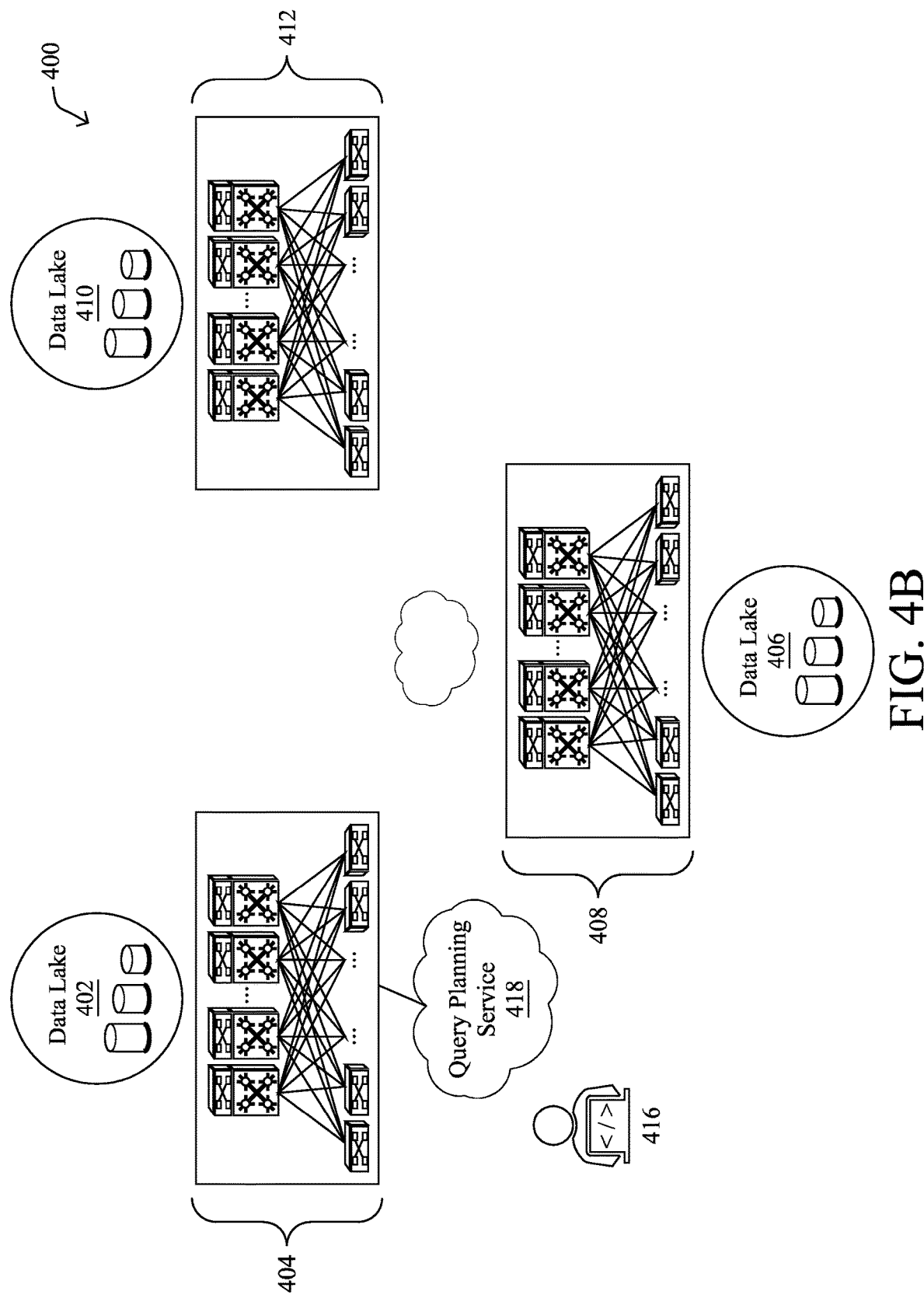

Turning to FIG. 4B, a device of first domain 404, upon receiving query 414, acting as a query planner, may be configured to analyze the correlation query and setup one or more data pipelines, filters, and minimize operators by performing a query planning service 418 (which may be performed by data lake query process 248 as described herein). It is to be understood that query receipt and/or planning may occur from any of the data lakes. Further, since a correlation join query may be understood seen as a join across multiple "tables", where the tables are the data lake sites (across which the applications may communicate). Query planning service 418 may analyze and process query 414 such that there is as less data movement (or traffic flow) as possible within a federation of data lakes, as shown, first data lake 402, second data lake 406, and third data lake 410. Of note, the query planner may take into consideration that pertinent or relevant information for query 414 may be in a same data lake or spread across multiple data lakes. Further, as will be described in be greater detail here in below, operational, resource, monetary, etc. costs may be minimized as well.

As previously mentioned, a metadata store of a particular data lake (e.g., first domain 404) may accessed by query planning service 418 when analyzing query 414. In particular, from the metadata store, query planning service 418 may take into account:

1. access details of all data lakes that are part of the federation (e.g., first data lake 402, second data lake 406, and third data lake 410);
2. end point information, for example, IP addresses, domain name system names, tags, application names, etc. across all the data lakes;
3. topology information of the fabrics, including identities of one or more layer-3 networking interfaces (e.g., a router);
4. route information that may be used to ascertain a kind of data traffic that is being output by a particular data lake (or fabric); or
5. cost of traffic movement among data lakes (where it is contemplated that this information may be entered into the metadata store by an end user, where the information may be used to determine a "direction" for respective data pipelines as well as a location for stitching of the pipeline).

Query planning service 418, as part of processing query 414, breaks query 414 down into one or more smaller operators for each of the data lakes (e.g., first data lake 402, second data lake 406, and third data lake 410), where the operators are connected to one another. That is, a data lake operator set may be understood as instructions that satisfy at least a part of information requested by query 414, for a given data lake. Particularly, in breaking apart query 414, query planning service 418 may take select data lakes where data lake operator sets are to be sent based on the previously described correlation query types. Notably, for user specified sites, query planning service 418 may create subnet filters and send the operators to a specific site as specified by the user. For user-specified only subnets, query planning service 418 may, using a metadata store, determine which subnet filters belong to which sites from an end point database (i.e., database of end-point IP addresses that are generating traffic). For user-specified tags, domain name system names, applications, etc., query planning service 418 may, using a metadata store, decide on sites and filters that are to be used.

Additionally, query planning service 418 may be configured to analyze query 414 so as to maximize source side reduction, which reduces an amount of data a particular data lake is to send out (for query 414). To this end, query planning service 418 may instruct a data lake, using data lake operator sets to perform filtering (which will be described in greater detail herein below with reference to FIG. 5). In maximizing source side reduction, query planning service 418 may also instruct data lakes so as to perform summarization, which causes flows (from a particular data lake to be summarized). That is, instead of sending each flow out as is from the data lake, a flow may be further summarized. For example, summarization may be instructed to occur at a granularity of 30 seconds, and, consequently, flows from data lakes may be summarized at a granularity of, for example, one minute, two minutes, five minutes, etc. so as to reduce the data traffic. In other words, to avoid network traffic, resultant flows can be compressed and sent to a "remote" data lake for stitching and correlation.

Query planning service 418 may also be configured to selecting a "best" destination data lake, where one or more data pipelines (that are established using data lake operator sets) are to be directed for final reduction, stitching, and correlation. More details with respect to how query planning service 418 may select a destination is described with respect to FIG. 6 herein below.

Figure 4C:
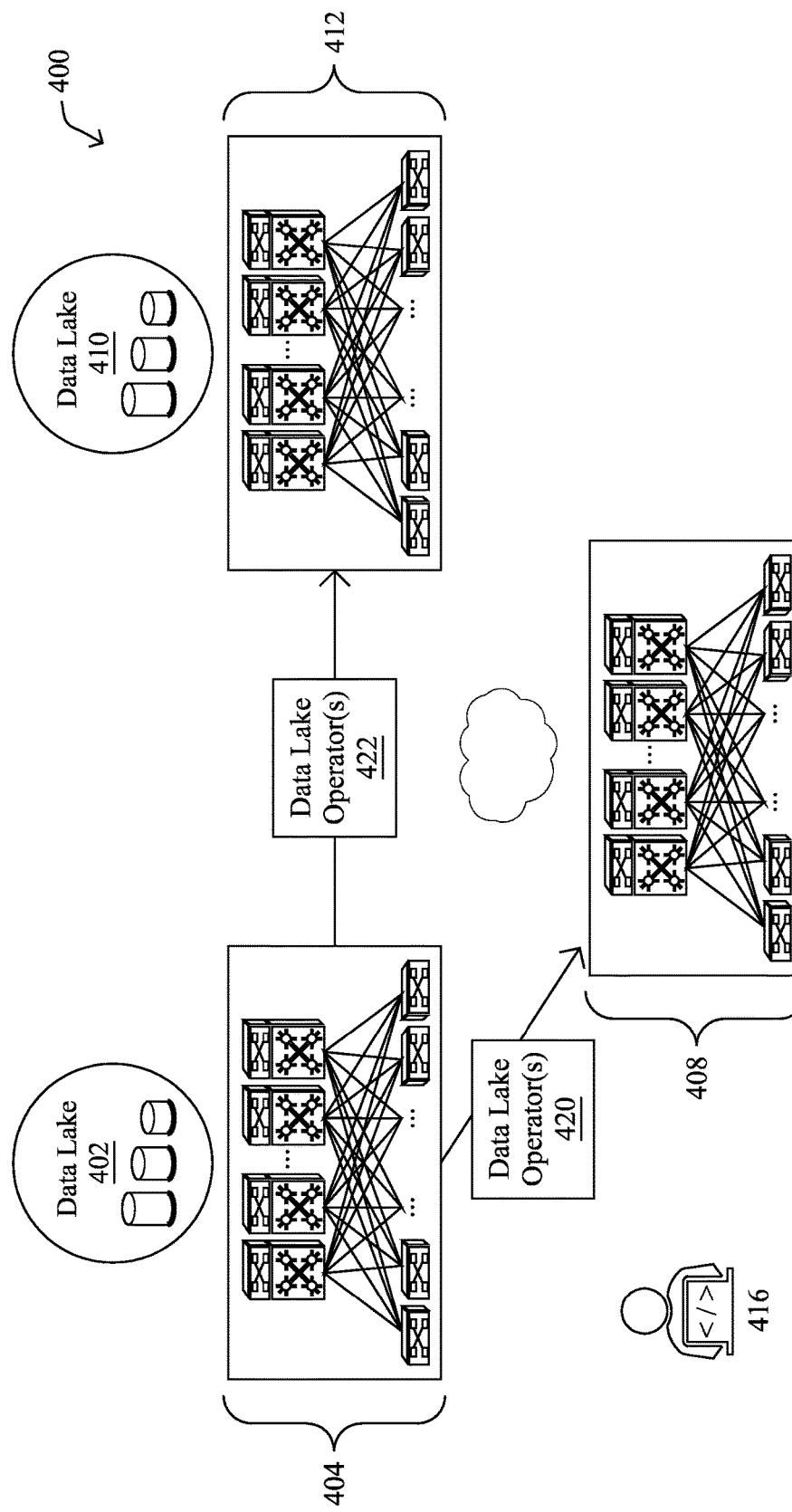

Turning now to FIG. 4C query planning service 418, based on where a data lake operator set is to be executed, may send them to as a first data lake operator set 420 to second domain 408 and a second data lake operator set 422 to third domain 412. These operator sets may be executed at a respective data lake to establish one or more data pipelines that achieve maximum source-side reduction and summarization, and the resultant information is streamed over the data pipelines to a next stage or operator. That is, the established data pipelines may be directed to a destination selected by query planning service 418. It is to be understood that a separate data lake operator set may be performed at first domain 404 to satisfy a part of query 414.

Figure 4D:
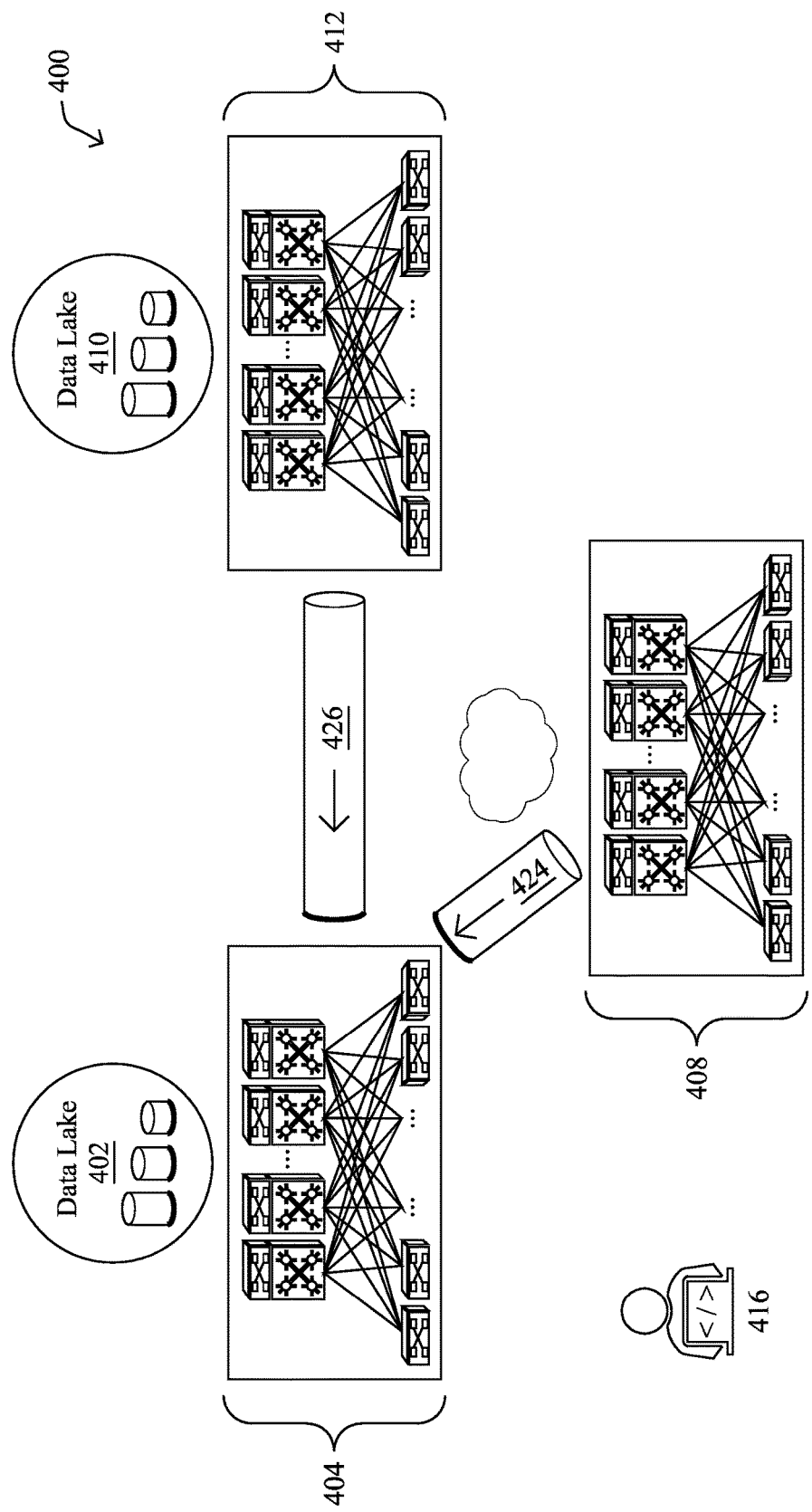

As shown in FIG. 4D, after respectively receiving first data lake operator set 420 a second data lake operator set 422, second domain 408 and third domain 412 may establish first pipelines 424 and second pipelines 426 towards first domain 404. Each of the data lakes may have an agent configured to setup and establish the pipelines with the specific operators decided by query planning service 418. Particularly, once query planning service 418 breaks down query 414 into operators, it communicates with the agents in the participating sites about the operators that need to be used, the filters that each operator should use, the order in which the operators need to be placed and the site location of the final reduce. Based on the plan provided, the agent sets up the operators and issues relevant queries to the data lake to start streaming of information used to respond to query 414. The information provided over first pipelines 424 and second pipelines 426 may, as will be described herein below with reference to FIG. 7, have specified fields.

After receiving the information that is responsive to query 414, first data lake 402 may be configured to stitch the received information so as to perform monitoring, analysis, etc. That is, troubleshooting regarding the stitched flow may be performed, which may be more readily accomplished using the end-to-end flow statistics ascertainable by the stitched information. It is contemplated that some issues that may be revealed, via correlation, may include:

- a hop-by-hop latency and overall latency determinations regarding a given flow across the group of federated data lakes (e.g., it is possible to exactly pin-point a switch or the port where the excess latency is introduced, and notification triggers may be configured based on various thresholds);
- identification of increases in application latency for an application being performed across the federated data lakes (e.g., buffer drops that occur because of congestion or a badly architected network may be identified);
- identification of connectivity issues based on improperly configured security policies or forwarding (e.g., based on drop counters); or
- flow path visibility, network statistics of applications across the data lakes, etc.

Figure 5:
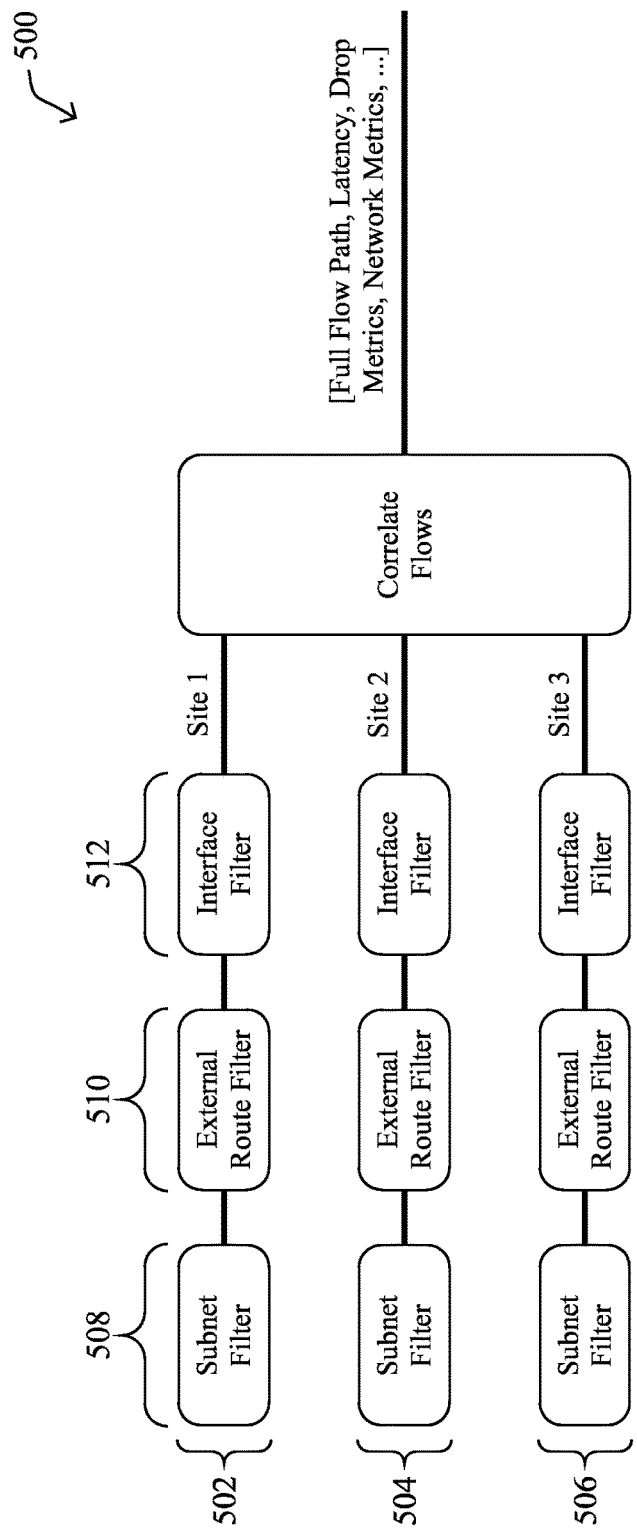
FIG. 5 illustrates example filter types for data lakes of a federated data lake architecture.

With reference now to FIG. 5, example filter types 500 for data lakes of a federated data lake architecture are shown. In particular, query planning service 418 may instruct a first data lake site 502, a second data lake site 504, and a third data lake site 506 to perform various types of filtering, including subnet filtering 508, external route filtering 510, and interface filtering 512. Subnet filtering 508 may be instructed when a user has specified particular subnets for monitoring and troubleshoot. The subnets may be derived from a correlation query for each site, such that only flows that match a filter are included as part of a data pipeline. In an embodiment, subnet filtering 508 may filter any flow where a source IP address or a destination IP address matches a filter.

External route filtering 510 may be instructed when filtering of traffic that is local to the fabric is desired. For example, if a given address pair (e.g., [source IP; destination IP]) is crossing a data lake or cannot be determined from a combination of information from an end point database and route database. In a specific example, if a flow's source IP address and destination IP address is part of a PL-ADM table, then the flow may be allowed to move on a next operator (and, if not, dropped). Interface filtering 512 may instructed when a flow record, along with a source IP address, a destination IP address, and one or more other metrics also has a path that the flow is taking in the fabric (e.g., data lake). That is, if an outgoing interface is not an interface that is connected to an external router (i.e., a non-layer-3 interface) then the flow may be dropped.

Figure 6:
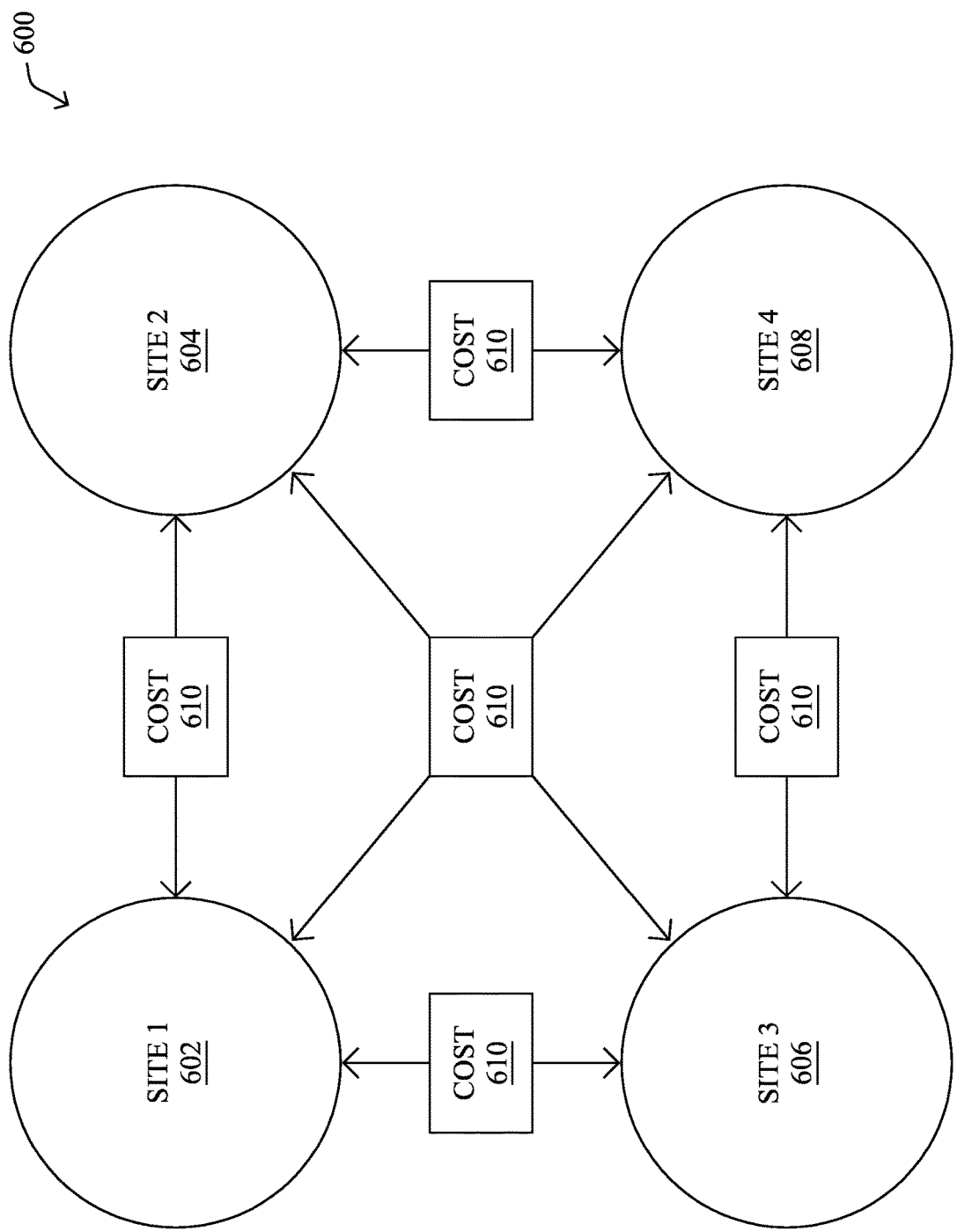
FIG. 6 illustrates an example diagram for how a destination for data lake operator sets may be selected.

Turning to FIG. 6, an example diagram 600 for how a destination for data lake operator sets may selected based on cost is shown. In particular, query planning service 418 may be determining which site among a first data lake site 602, a second data lake site 604, a third data lake site 606, and a fourth data lake site 608 is to be selected as a destination for one or more establish data pipelines and for stitching and final reduction. As described herein above, query planning service 418 may make this determination based on reducing network resource cost (e.g. bandwidth, latency, etc.), energy cost, and monetary cost of the data traffic for the customer. That is, it is contemplated that transferring data over a WAN may be expensive (as opposed to alternative destination options). It is contemplated that an end user may enter values for each of these costs 610 (across different directions between the data lake sites), or other mechanisms for determining such costs may also be used herein.

FIG. 7 illustrates an example data structure 700 for information that may be sent over data pipelines by federated data lake sites. In particular, data structure 700 may, as shown, include a fabric name field 702, an IP information field 704 (source IP, source port, destination IP, destination port, protocol), a flow path field 706 (ingress port and egress port of each device/switch the flow travels through), port where the packet was dropped field 708 (if the packet it dropped), a network statistics (stats) field 710 (e.g., number of packets, bytes, etc.), a drop counter field 712 (e.g., number of drops by reason: policy drop, forwarding drop, etc.), a latency field 714 (time taken by the flow to pass through the fabric), a timestamp field 716 (start and end timestamps of the collection), and a TCP flag(s) field 718. Other fields 720 are also contemplated, and the data structure 700 is merely an example non-limiting implementation. In other words, data structure 700 may be sent as part of a flow in response to query planning service 418 instructing data lakes using a data lake operator set. For flows going across the fabric (i.e., data lakes), the five-tuple (source IP address, source port, destination IP address, destination port, and protocol type) is the same for a given federated data lake. This five-tuple may thus serve as a key for correlations that may be performed for the flows from a federated data lake/query.

Figure 8:
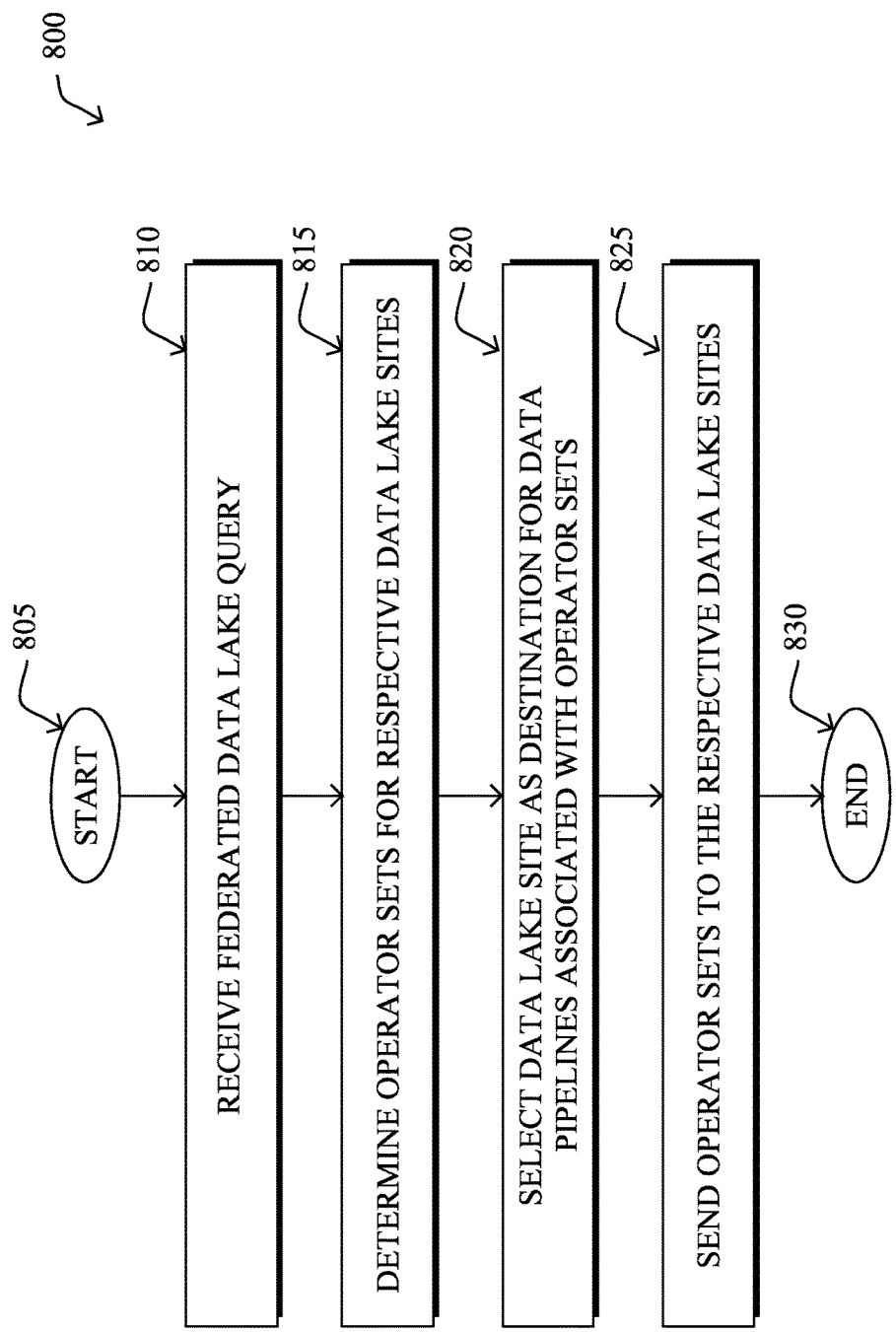
FIG. 8 illustrates an example simplified procedure for data stitching across federated data lakes in accordance with one or more embodiments described herein.

In closing, FIG. 8 illustrates an example simplified procedure for data stitching across federated data lakes in accordance with one or more embodiments described herein, particularly from the perspective of a device of a data lake. For example, a non-generic, specifically configured device (e.g., device 200) may perform procedure 800 by executing stored instructions (e.g., process 248, such as a data lake query process). The procedure 800 may start at step 805, and continues to step 810, where, as described in greater detail above, a device, in communication with a plurality of data lake sites, may receive a federated data lake query. In an embodiment, the plurality of data lake sites comprise one or more sites selected from a group consisting of: a data center, a wide area network, a campus infrastructure, and a virtualized/containerized infrastructure. In one particular embodiment, wherein the federated data lake query comprises a correlation query that correlates information selected from a group consisting of: site names and subnets of the plurality of data lake sites; subnets of the plurality of data lake sites; and application mappings, application tags, and domain name system mapping.

At step 815, the device may determine, based on the federated data lake query, a plurality of data lake operator sets that each correspond to one of the plurality of data lake sites, wherein each of the plurality of data lake operator sets is used to establish a respective data pipeline for the federated data lake query. In an embodiment, determining the plurality of data lake operator sets that each correspond to one of the plurality of data lake sites comprises: analyzing, by the device and based on a metadata store, the federated data lake query, wherein the metadata store comprises information of the plurality of data lake sites that is selected from a group consisting of: access details; endpoint information; topology information; path information; and traffic movement cost. In one embodiment, each of the plurality of data lake operator sets comprises information used for filtering data that is selected from a group consisting of: subnet filtering information; external route filtering information; and interface filtering information.

At step 820, the device may select a particular data lake site of the plurality of data lake sites as a destination for one or more data pipelines that are established for the federated data lake query. In an embodiment, selecting the particular data lake site of the plurality of data lake sites as the destination for the one or more data pipelines is based on minimizing one or more costs associated with the one or more data pipelines.

At step 825, the device may send the plurality of data lake operator sets that each correspond to one of the plurality of data lake sites to cause the plurality of data lake sites to send query results to the particular data lake site using the one or more data pipelines, wherein the particular data lake site is configured to stitch the query results for the federated data lake query. In an embodiment, the particular data lake site may be further configured to correlate the query results to determine a correlation selected from a group consisting of: an end-to-end path across the plurality of data lake sites; latency of a flow associated with the plurality of data lake sites; hop-by-hop latency of the flow associated with the plurality of data lake sites; drop information of the flow associated with the plurality of data lake sites; and network statistics of the flow associated with the plurality of data lake sites. In one or more embodiments, the query results may comprise a five-tuple of information, wherein the information is selected from a group consisting of: a source internet protocol (IP) address; a source port; destination IP; a destination port; and a protocol type. In one particular embodiment, the query results may comprise information that is selected from a group consisting of: telemetry information; application performance information; and sensor information.

The simplified procedure 800 may then end in step 830, notably with the ability to continue receiving and processing federated data lake queries. Other steps may also be included generally within procedure 800. For example, such steps (or, more generally, such additions to steps already specifically illustrated above), may include: where the device is from a given data lake site that is not the particular data lake site, performing, by the device, one of the plurality of data lake operator sets to establish a particular data pipeline for the federated data lake query; and sending, by the device and using the particular data pipeline, query results from the given data lake site to the particular data lake site; wherein the device is from the particular data lake site, receiving, by the device, the query results over the one or more data pipelines from the plurality of data lake sites; and stitching, by the device, the query results for the federated data lake query; and so on. Also, such steps that may be further included may be based on perspectives of other devices in the architecture, such as receiving the operator sets at a respective data lake site, performing the query, returning the query results over the data pipelines, etc.

It should be noted that while certain steps within procedure 800 may be optional as described above, the steps shown in FIG. 8 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, provide for data stitching across federated data lakes. In particular, the techniques herein allow for gathering of information for troubleshooting or visibility for a group of federated data lakes, without the need of a central data lake. That is, a plurality of data lakes may be viewed as a group federated data lake, which may be queried for telemetry information, sensor information, application performance information, etc. Flows of information from each of the data lakes may be received by a particular data lake that is selected as a destination. At this selected data lake, streams of information (i.e., flows) from each of the individual data lakes may be stitched across-data centers and/or across-domains. The stitched flows may then be used to gain actionable information and/or insights for the federated data lakes (that comprise the networking architecture), including, end-to-end flow path info across data lakes, latency of flows (across and within data lakes), hop-by-hop latency, etc.).

Illustratively, the techniques described herein may be performed by hardware, software, and/or firmware, such as in accordance with the illustrative data lake query process 248, which may include computer executable instructions executed by the processor 220 to perform functions relating to the techniques described herein, e.g., in conjunction with corresponding processes of other devices in the computer network as described herein (e.g., on network agents, controllers, computing devices, servers, etc.). In addition, the components herein may be implemented on a singular device or in a distributed manner, in which case the combination of executing devices can be viewed as their own singular "device" for purposes of executing the process 248.

According to the embodiments herein, an illustrative method herein may comprise: receiving, at a device in communication with a plurality of data lake sites, a federated data lake query; determining, by the device and based on the federated data lake query, a plurality of data lake operator sets that each correspond to one of the plurality of data lake sites, wherein each of the plurality of data lake operator sets is used to establish a respective data pipeline for the federated data lake query; selecting, by the device, a particular data lake site of the plurality of data lake sites as a destination for one or more data pipelines that are established for the federated data lake query; and sending, by the device, the plurality of data lake operator sets that each correspond to one of the plurality of data lake sites to cause the plurality of data lake sites to send query results to the particular data lake site using the one or more data pipelines, wherein the particular data lake site is configured to stitch the query results for the federated data lake query.

In one embodiment, the plurality of data lake sites may comprise one or more sites selected from a group consisting of: a data center, a wide area network, a campus infrastructure, and a virtualized/containerized infrastructure. In one embodiment, the federated data lake query may comprise a correlation query that correlates information selected from a group consisting of: site names and subnets of the plurality of data lake sites; subnets of the plurality of data lake sites; and application mappings, application tags, and domain name system mappings. In one embodiment, the device may be from a given data lake site that is not the particular data lake site, the illustrative method further comprising: performing, by the device, one of the plurality of data lake operator sets to establish a particular data pipeline for the federated data lake query; and sending, by the device and using the particular data pipeline, query results from the given data lake site to the particular data lake site. In one embodiment, the device may from the particular data lake site, the illustrative method further comprising: receiving, by the device, the query results over the one or more data pipelines from the plurality of data lake sites; and stitching, by the device, the query results for the federated data lake query. In one embodiment, determining the plurality of data lake operator sets that each correspond to one of the plurality of data lake sites may comprise: analyzing, by the device and based on a metadata store, the federated data lake query, wherein the metadata store comprises information of the plurality of data lake sites that is selected from a group consisting of: access details; endpoint information; topology information; path information; and traffic movement cost. In one embodiment, each of the plurality of data lake operator sets may comprise information used for filtering data that is selected from a group consisting of: subnet filtering information; external route filtering information; and interface filtering information. In one embodiment, selecting the particular data lake site of the plurality of data lake sites as the destination for the one or more data pipelines may be based on minimizing one or more costs associated with the one or more data pipelines. In one embodiment, the particular data lake site may be further configured to correlate the query results to determine a correlation selected from a group consisting of: an end-to-end path across the plurality of data lake sites; latency of a flow associated with the plurality of data lake sites; hop-by-hop latency of the flow associated with the plurality of data lake sites; drop information of the flow associated with the plurality of data lake sites; and network statistics of the flow associated with the plurality of data lake sites. In one embodiment, the query results may comprise a five-tuple of information, wherein the information is selected from a group consisting of: a source internet protocol (IP) address; a source port; destination IP; a destination port; and a protocol type. In one embodiment, the query results may comprise information that is selected from a group consisting of: telemetry information; application performance information; and sensor information.

According to the embodiments herein, an illustrative tangible, non-transitory, computer-readable medium storing program instructions that cause a device in communication with a plurality of data lake sites to execute a process comprising: receiving, at the device, a federated data lake query; determining, based on the federated data lake query, a plurality of data lake operator sets that each correspond to one of the plurality of data lake sites, wherein each of the plurality of data lake operator sets is used to establish a respective data pipeline for the federated data lake query; selecting a particular data lake site of the plurality of data lake sites as a destination for one or more data pipelines that are established for the federated data lake query; and sending the plurality of data lake operator sets that each correspond to one of the plurality of data lake sites to cause the plurality of data lake sites to send query results to the particular data lake site using the one or more data pipelines, wherein the particular data lake site is configured to stitch the query results for the federated data lake query Further, according to the embodiments herein an illustrative apparatus herein may comprise: one or more network interfaces to communicate with a plurality of data lake sites; a processor coupled to the network interfaces and configured to execute one or more processes; and a memory configured to store a process that is executable by the processor, the process, when executed, configured to: receive a federated data lake query; determine, based on the federated data lake query, a plurality of data lake operator sets that each correspond to one of the plurality of data lake sites, wherein each of the plurality of data lake operator sets is used to establish a respective data pipeline for the federated data lake query; select a particular data lake site of the plurality of data lake sites as a destination for one or more data pipelines that are established for the federated data lake query; and send the plurality of data lake operator sets that each correspond to one of the plurality of data lake sites to cause the plurality of data lake sites to send query results to the particular data lake site using the one or more data pipelines, wherein the particular data lake site is configured to stitch the query results for the federated data lake query.

While there have been shown and described illustrative embodiments above, it is to be understood that various other adaptations and modifications may be made within the scope of the embodiments herein. For example, while certain embodiments are described herein with respect to certain types of networks in particular, the techniques are not limited as such and may be used with any computer network, generally, in other embodiments. Moreover, while specific technologies, protocols, and associated devices have been shown, such as Java, TCP, IP, and so on, other suitable technologies, protocols, and associated devices may be used in accordance with the techniques described above. In addition, while certain devices are shown, and with certain functionality being performed on certain devices, other suitable devices and process locations may be used, accordingly. That is, the embodiments have been shown and described herein with relation to specific network configurations (orientations, topologies, protocols, terminology, processing locations, etc.). However, the embodiments in their broader sense are not as limited, and may, in fact, be used with other types of networks, protocols, and configurations.

Moreover, while the present disclosure contains many other specifics, these should not be construed as limitations on the scope of any embodiment or of what may be claimed, but rather as descriptions of features that may be specific to particular embodiments of particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Further, although features may be described above as acting in certain combinations and even initially claimed as such, one or more features from a claimed combination can in some cases be excised from the combination, and the claimed combination may be directed to a sub-combination or variation of a sub-combination.

For instance, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in the present disclosure should not be understood as requiring such separation in all embodiments.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true intent and scope of the embodiments herein.

What is claimed is:

1. A method, comprising:
receiving, at a device in communication with a plurality of data lake sites, a federated data lake query;
determining, by the device and based on the federated data lake query, a plurality of data lake operator sets that each correspond to one of the plurality of data lake sites, wherein each of the plurality of data lake operator sets is used to establish a respective data pipeline for the federated data lake query;
selecting, by the device, a particular data lake site of the plurality of data lake sites as a destination for one or more data pipelines that are established for the federated data lake query; and
sending, by the device, the plurality of data lake operator sets that each correspond to one of the plurality of data lake sites to cause the plurality of data lake sites to send query results to the particular data lake site using the one or more data pipelines, wherein the particular data lake site is configured to stitch the query results for the federated data lake query.

2. The method as in claim 1, wherein the plurality of data lake sites comprise one or more sites selected from a group consisting of: a data center, a wide area network, a campus infrastructure, and a virtualized/containerized infrastructure.

3. The method as in claim 1, wherein the federated data lake query comprises a correlation query that correlates information selected from a group consisting of: site names and subnets of the plurality of data lake sites; subnets of the plurality of data lake sites; and application mappings, application tags, and domain name system mappings.

4. The method as in claim 1, wherein the device is from a given data lake site that is not the particular data lake site, the method further comprising:
performing, by the device, one of the plurality of data lake operator sets to establish a particular data pipeline for the federated data lake query; and
sending, by the device and using the particular data pipeline, query results from the given data lake site to the particular data lake site.

5. The method as in claim 1, wherein the device is from the particular data lake site, the method further comprising:
receiving, by the device, the query results over the one or more data pipelines from the plurality of data lake sites; and
stitching, by the device, the query results for the federated data lake query.

6. The method as in claim 1, wherein determining the plurality of data lake operator sets that each correspond to one of the plurality of data lake sites comprises:
analyzing, by the device and based on a metadata store, the federated data lake query, wherein the metadata store comprises information of the plurality of data lake sites that is selected from a group consisting of: access details; end point information; topology information; path information; and traffic movement cost.

7. The method as in claim 1, wherein each of the plurality of data lake operator sets comprises information used for filtering data that is selected from a group consisting of: subnet filtering information; external route filtering information; and interface filtering information.

8. The method as in claim 1, wherein selecting the particular data lake site of the plurality of data lake sites as the destination for the one or more data pipelines is based on minimizing one or more costs associated with the one or more data pipelines.

9. The method as in claim 1, wherein the particular data lake site is further configured to correlate the query results to determine a correlation selected from a group consisting of: an end-to-end path across the plurality of data lake sites; latency of a flow associated with the plurality of data lake sites; hop-by-hop latency of the flow associated with the plurality of data lake sites; drop information of the flow associated with the plurality of data lake sites; and network statistics of the flow associated with the plurality of data lake sites.

10. The method as in claim 1, wherein the query results comprise a five-tuple of information, wherein the information is selected from a group consisting of: a source internet protocol (IP) address; a source port; destination IP; a destination port; and a protocol type.

11. The method as in claim 1, wherein the query results comprise information that is selected from a group consisting of: telemetry information; application performance information; and sensor information.

12. An apparatus, comprising:
one or more network interfaces to communicate with a plurality of data lake sites;
a processor coupled to the one or more network interfaces and configured to execute one or more processes; and
a memory configured to store a process that is executable by the processor, the process when executed configured to:
receive a federated data lake query;
determine, based on the federated data lake query, a plurality of data lake operator sets that each correspond to one of the plurality of data lake sites, wherein each of the plurality of data lake operator sets is used to establish a respective data pipeline for the federated data lake query;
select a particular data lake site of the plurality of data lake sites as a destination for one or more data pipelines that are established for the federated data lake query; and
send the plurality of data lake operator sets that each correspond to one of the plurality of data lake sites to cause the plurality of data lake sites to send query results to the particular data lake site using the one or more data pipelines, wherein the particular data lake site is configured to stitch the query results for the federated data lake query.

13. The apparatus as in claim 12, wherein the federated data lake query comprises a correlation query that correlates information selected from a group consisting of: site names and subnets of the plurality of data lake sites; subnets of the plurality of data lake sites; and application mappings, application tags, and domain name system mappings.

14. The apparatus as in claim 12, wherein the apparatus is from a given data lake site that is not the particular data lake site, the process when executed further configured to:
perform one of the plurality of data lake operator sets to establish a particular data pipeline for the federated data lake query; and
send, using the particular data pipeline, query results from the given data lake site to the particular data lake site.

15. The apparatus as in claim 12, wherein the apparatus is from the particular data lake site, the process when executed further configured to:
receive the query results over the one or more data pipelines from the plurality of data lake sites; and
stitch the query results for the federated data lake query.

16. The apparatus as in claim 12, wherein to determine the plurality of data lake operator sets that each correspond to one of the plurality of data lake sites comprises:
analyzing, based on a metadata store, the federated data lake query, wherein the metadata store comprises information of the plurality of data lake sites that is selected from a group consisting of: access details; end point information; topology information; path information; and traffic movement cost.

17. The apparatus as in claim 12, wherein each of the plurality of data lake operator sets comprises information used for filtering data that is selected from a group consisting of: subnet filtering information; external route filtering information; and interface filtering information.

18. The apparatus as in claim 12, wherein to select the particular data lake site of the plurality of data lake sites as the destination for the one or more data pipelines is based on minimizing one or more costs associated with the one or more data pipelines.

19. The apparatus as in claim 12, wherein the particular data lake site is further configured to correlate the query results to determine a correlation selected from a group consisting of: an end-to-end path across the plurality of data lake sites; latency of a flow associated with the plurality of data lake sites; hop-by-hop latency of the flow associated with the plurality of data lake sites; drop information of the flow associated with the plurality of data lake sites; and network statistics of the flow associated with the plurality of data lake sites.

20. A tangible, non-transitory, computer-readable medium storing program instructions that cause a device in communication with a plurality of data lake sites to execute a process comprising:
receiving, at the device, a federated data lake query;
determining, based on the federated data lake query, a plurality of data lake operator sets that each correspond to one of the plurality of data lake sites, wherein each of the plurality of data lake operator sets is used to establish a respective data pipeline for the federated data lake query;
selecting a particular data lake site of the plurality of data lake sites as a destination for one or more data pipelines that are established for the federated data lake query; and
sending the plurality of data lake operator sets that each correspond to one of the plurality of data lake sites to cause the plurality of data lake sites to send query results to the particular data lake site using the one or more data pipelines, wherein the particular data lake site is configured to stitch the query results for the federated data lake query.

\* \* \* \* \*